(12) United States Patent  
Nawal et al.

(10) Patent No.: US 10,410,151 B2  
(45) Date of Patent: Sep. 10, 2019

(54) STRATEGIC DECISION SUPPORT MODEL FOR SUPPLY CHAIN

(71) Applicant: Accenture Global Services Limited, Dublin (IE)

(72) Inventors: Ankur Nawal, Noida (IN); Anil J. Tanwani, Noida (IN); Anurag Gulati, Noida (IN)

(73) Assignee: Accenture Global Services Limited, Dublin (IE)

( * ) Notice: Subject to any disclaimer, the term of this patent is extended or adjusted under 35 U.S.C. 154(b) by 866 days.

(21) Appl. No.: 14/714,673

(22) Filed: May 18, 2015

(65) Prior Publication Data

US 2016/0342914 A1 Nov. 24, 2016

(51) Int. Cl.
  *G06Q 10/08* (2012.01)
  *G06Q 10/06* (2012.01)
  *G06Q 10/10* (2012.01)

(52) U.S. Cl.
  CPC . *G06Q 10/06313* (2013.01); *G06Q 10/06315* (2013.01); *G06Q 10/08* (2013.01); *G06Q 10/103* (2013.01)

(58) Field of Classification Search
  None
  See application file for complete search history.

(56) References Cited

U.S. PATENT DOCUMENTS

| 6,523,027 | B1 * | 2/2003 | Underwood | G06F 9/465 |
| 6,671,818 | B1 * | 12/2003 | Mikurak | G06Q 10/06 714/4.21 |
| 6,704,873 | B1 * | 3/2004 | Underwood | H04L 63/02 709/223 |
| 6,810,415 | B2 * | 10/2004 | Allen | G06F 17/30554 709/219 |

(Continued)

FOREIGN PATENT DOCUMENTS

EP 2296395 A1 3/2011

OTHER PUBLICATIONS

Wikipedia, "Product lifecycle," http://en.wikipedia.org/wiki/Product_lifecycle, Apr. 30, 2015, 12 pages.

(Continued)

*Primary Examiner* — Thomas L Mansfield  
(74) *Attorney, Agent, or Firm* — Harrity & Harrity, LLP

(57) ABSTRACT

A device may provide a user interface for receiving a set of project variables for a replacement project. The device may receive the set of project variables for the replacement project via the user interface. The replacement project may include a decision regarding replacing a product. The device may determine a set of deployment strategies associated with the replacement project based on the set of project variables. Each deployment strategy, in the set of deployment strategies, may be associated with a type of replacement, a timeframe for deployment of the type of replacement, and a geographical scope for deployment of the type of replacement. The device may determine a set of end-to- (Continued)

end cost scores for the set of deployment strategies. The device may provide information identifying a deployment strategy of the set of deployment strategies based on the set of end-to-end cost scores for the set of deployment strategies.

20 Claims, 7 Drawing Sheets

(56) References Cited

U.S. PATENT DOCUMENTS

| | | |
|---|---|---|
| 7,231,374 B1 | 6/2007 | Balasinski |
| 7,899,770 B2 | 3/2011 | Thie et al. |
| 8,799,044 B2 | 5/2014 | Sudarshan et al. |
| 8,943,010 B2 | 1/2015 | Hutson et al. |
| 2003/0033191 A1 | 2/2003 | Davies et al. |
| 2005/0065842 A1* | 3/2005 | Summers ............... G06Q 10/06 705/305 |
| 2005/0071223 A1 | 3/2005 | Jain et al. |
| 2006/0041840 A1* | 2/2006 | Blair ..................... G06F 17/227 715/249 |
| 2006/0271380 A1* | 11/2006 | Chowdhury ........... G06Q 10/00 705/304 |
| 2007/0112574 A1* | 5/2007 | Greene ................. G06F 9/5072 340/572.1 |
| 2007/0192170 A1* | 8/2007 | Cristol ................... G06Q 10/00 705/7.12 |
| 2010/0134257 A1* | 6/2010 | Puleston .............. G06K 7/0008 340/10.4 |
| 2012/0221371 A1* | 8/2012 | Hegazy ................ G06Q 10/087 705/7.25 |
| 2015/0324681 A1* | 11/2015 | Mats ................ G06K 19/07766 235/492 |

OTHER PUBLICATIONS

European Search Report corresponding to EP 16 17 0096 dated Sep. 13, 2016, 7 pages.

* cited by examiner

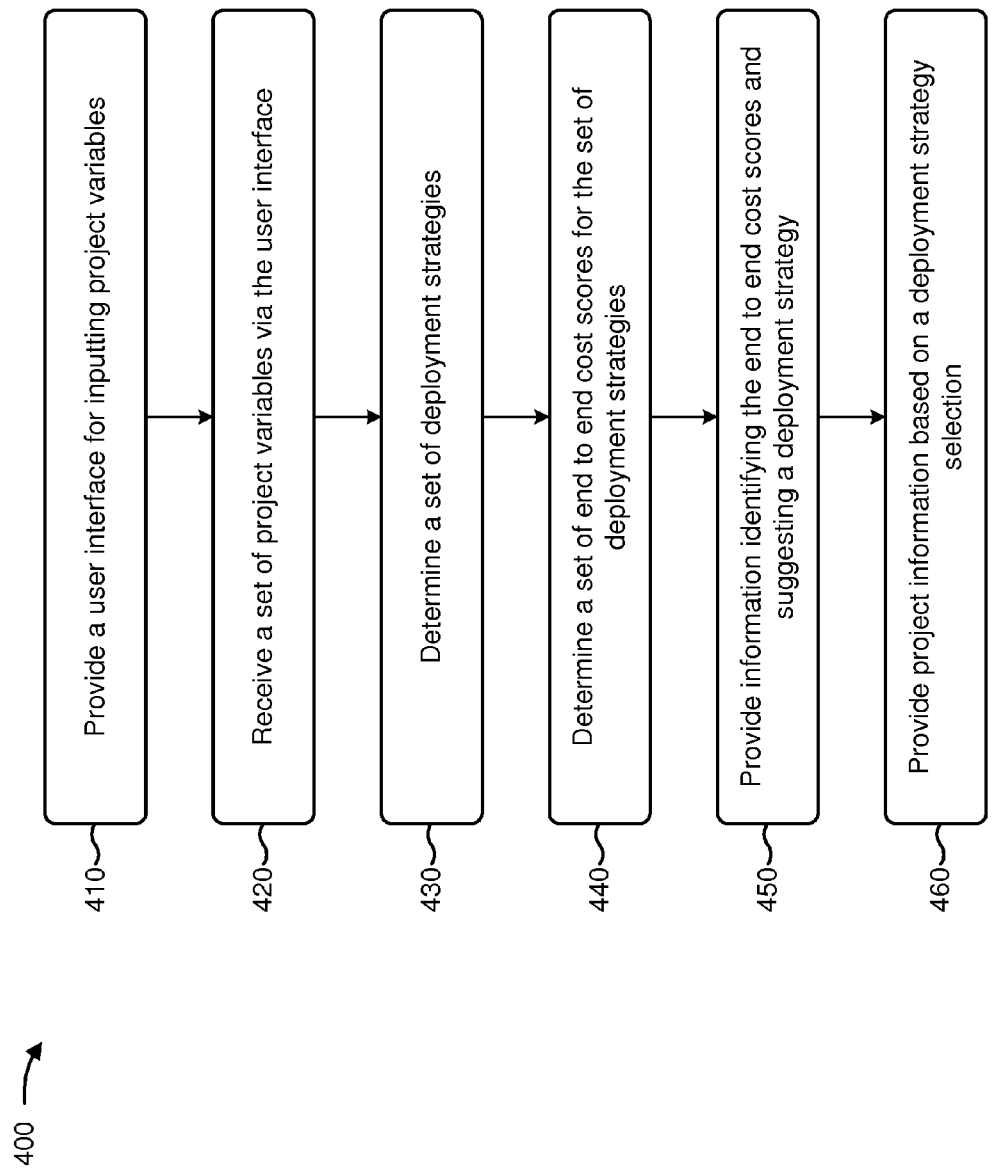

STRATEGIC DECISION SUPPORT MODEL FOR SUPPLY CHAIN

BACKGROUND

A decision support model may include a computer-based information system that provides information in support of organizational decision-making activities. A user may utilize the decision support model to receive information identifying potential results of a particular decision. Product lifecycle management may refer to the process of managing the entire lifecycle of a product, including replacement of the product, scrapping of the product, and design of another product.

SUMMARY

According to some possible implementations, a device may provide a user interface for receiving a set of project variables for a replacement project. The device may receive the set of project variables for the replacement project via the user interface. The replacement project may include a decision regarding replacing a product. The device may determine a set of deployment strategies associated with the replacement project based on the set of project variables. Each deployment strategy, in the set of deployment strategies, may be associated with a type of replacement, a parameter identifying a timeframe for deployment of the type of replacement, and a parameter identifying a geographical scope for deployment of the type of replacement. The device may determine a set of end-to-end cost scores for the set of deployment strategies. The device may provide information identifying one or more deployment strategies of the set of deployment strategies based on the set of end-to-end cost scores for the set of deployment strategies.

According to some possible implementations, a computer-readable medium may store one or more instructions that, when executed by one or more processors, cause the one or more processors to receive a set of project variables for repairing a product, upgrading the product, and re-designing the product. The one or more instructions may cause the one or more processors to determine a set of deployment strategies associated with repairing the product, upgrading the product, and re-designing the product based on the set of project variables. A deployment strategy, in the set of deployment strategies, may be associated with a timeframe for deployment and a geographic scope of deployment. The one or more instructions may cause the one or more processors to rank the set of deployment strategies based on a set of quantitative measures associated with the set of deployment strategies and the set of project variables. The one or more instructions may cause the one or more processors to provide information identifying one or more of deployment strategies of the ranked set of deployment strategies based on respective quantitative measures in the set of quantitative measures.

According to some possible implementations, a method may include determining, by a device, a set of project variables associated with a product replacement project. The method may include determining, by the device, a set of project criteria associated with the product replacement project. The method may include selecting, by the device, a set of deployment strategies for the product replacement project that satisfy the set of project criteria based on the set of project variables. The method may include determining, by the device, a set of end-to-end costs for the set of deployment strategies. The method may include selecting, by the device, a deployment strategy, of the set of deployment strategies, based on determining the set of end-to-end costs for the set of deployment strategies. The method may include providing, by the device, information regarding the selected deployment strategy.

BRIEF DESCRIPTION OF THE DRAWINGS

FIG. 4 is a flow chart of an example process for identifying deployment strategies for a product replacement decision based on end-to-end cost analysis.

DETAILED DESCRIPTION

The following detailed description of example implementations refers to the accompanying drawings. The same reference numbers in different drawings may identify the same or similar elements.

A user may intend to determine a deployment strategy associated with a product replacement project (e.g., a replacement of a product via a product re-design, a product upgrade, or the like) as a result of a material non-availability, a defective design, a product life failing to meet design specifications, a lack of customer satisfaction with the product, an excessive cost for the product, a technology upgrade associated with the product, or the like. The user may determine a particular deployment strategy that includes a replacement component (e.g., whether the product is to be re-designed, upgraded, etc.), a timeframe component (e.g., whether the product is to be replaced in a particular year, over a period of time, at a particular rate of replacement, etc.), a geographic scope component (e.g., whether the product is to be replaced in all areas, in a particular area, in a particular set of areas, in a particular order of areas, etc.), or the like. However, the user may lack sufficient information to effectively select a particular deployment strategy that balances long-term and short-term costs. Implementations, described herein, may provide decision support to a user by identifying a set of deployment strategies for a product replacement project that satisfy end-to-end cost criteria based on a set of project variables associated with the product replacement project.

Figure 1:
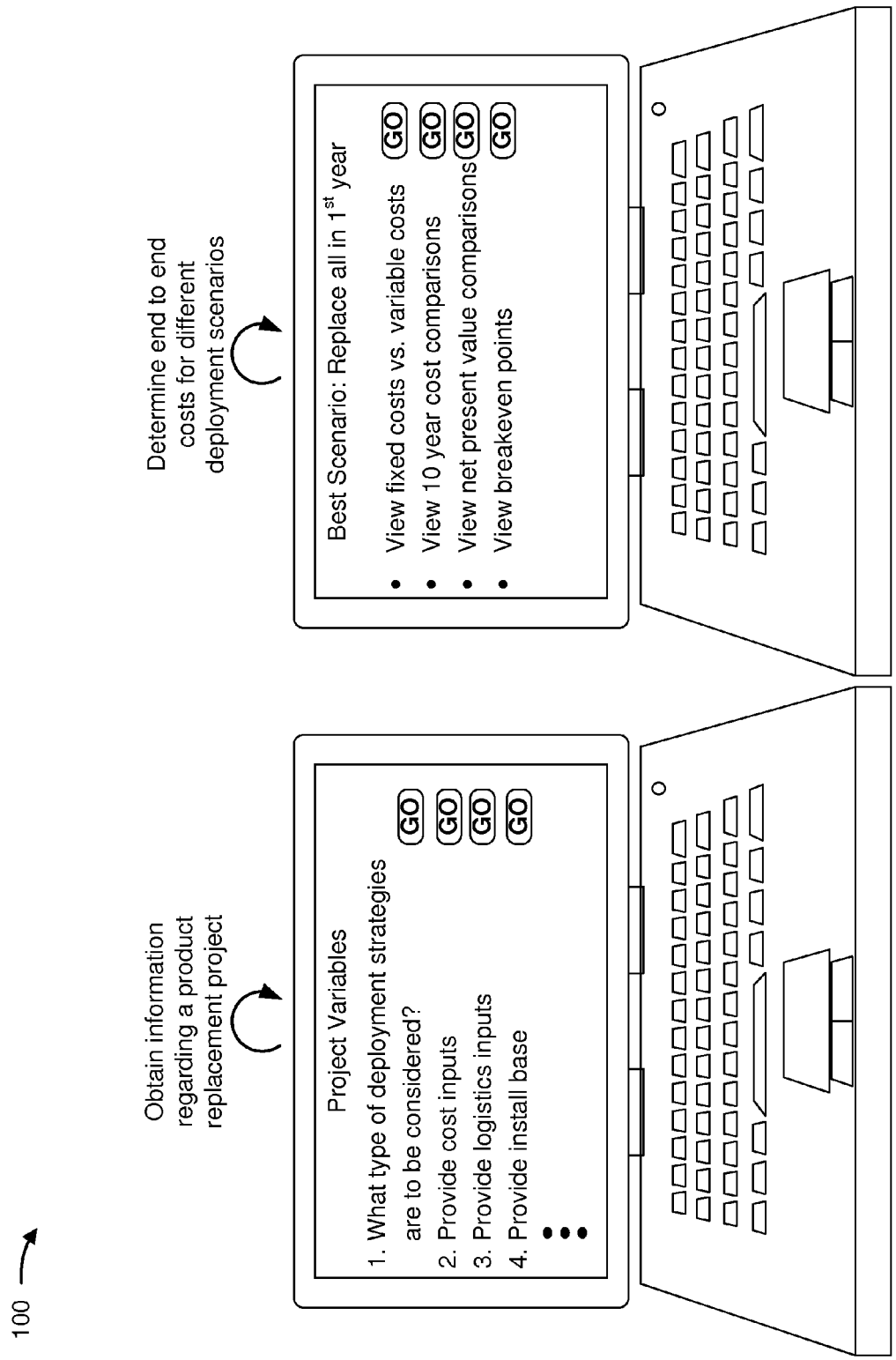
FIG. 1 is a diagram of an overview of an example implementation described herein.

FIG. 1 is a diagram of an overview of an example implementation 100 described herein. As shown in FIG. 1, a user device may provide, to a user, a user interface with which to input information (e.g., a set of project variables) regarding a product replacement project (e.g., a project associated with a product replacement decision). A product replacement decision may refer to repairing a product, upgrading a product, re-designing a product, or the like, and may be associated with a particular deployment strategy. A deployment strategy may refer to one or more components of the product replacement decision, such as a timeframe for the product replacement (e.g., all products are to be replaced immediately, all products are to be replaced at a particular time, a particular quantity of products are to be replaced at a particular time, etc.), a geographic scope for the product replacement (e.g., product replacement is to be confined to a particular geographic area, product replacement is to occur first at a first geographic area and is to occur second at a second geographic area, etc.), a manner of product replacement (e.g., upgrading the product, re-designing the product, repairing the product, etc.), or the like. The user may provide project variables regarding the product replacement decision, such as information identifying potential deployment strategies, information identifying costs associated with product replacement, information associated with logistics, information identifying existing stocks of the product, or the like. The user device may provide the information to a server device for processing. In some implementations, the server device may suggest project variable information based on stored information identifying project variables associated with other projects.

As further shown in FIG. 1, the server device may determine end-to-end costs associated with different deployment strategies. For example, the server device may identify a set of deployment strategies based on the project variables, a set of project criteria, or the like, and may determine that a particular subset of the different deployment strategies satisfy a set of threshold project criteria (e.g., a short-term cost criteria, a long-term cost criteria, a customer satisfaction criteria, a risk criteria, or the like). The server device may provide information identifying the different deployment strategies, the particular subset of the different deployment strategies that satisfy the set of threshold project criteria, or the like. For example, server device 220 may determine a particular deployment strategy that best satisfies one or more project criteria (e.g., a threshold determination in comparison with other deployment strategies), and may provide information associated with the particular deployment strategy. The server device may provide, via the user interface and the user device, the information associated with the different deployment strategies, such as information identifying fixed costs and variable costs, information identifying multi-year cost comparisons, information identifying net present values, information identifying break-even points, or the like. In some implementations, the server device may provide expected customer satisfaction information. In some implementations, the server device may provide information identifying project variables that, if adjusted, significantly affect end-to-end costs (e.g., significantly as compared to a threshold).

In this way, a server device may provide a user with a set of deployment strategies for a product replacement project that account for end-to-end costs, thereby facilitating consistent decision-making with regards to a product replacement decisions. Furthermore, the server device may facilitate efficient product lifecycle management by providing information regarding cost-effectiveness, by providing continuing monitoring of a deployment strategy, by altering the deployment strategy based on new information, or the like.

Figure 2:
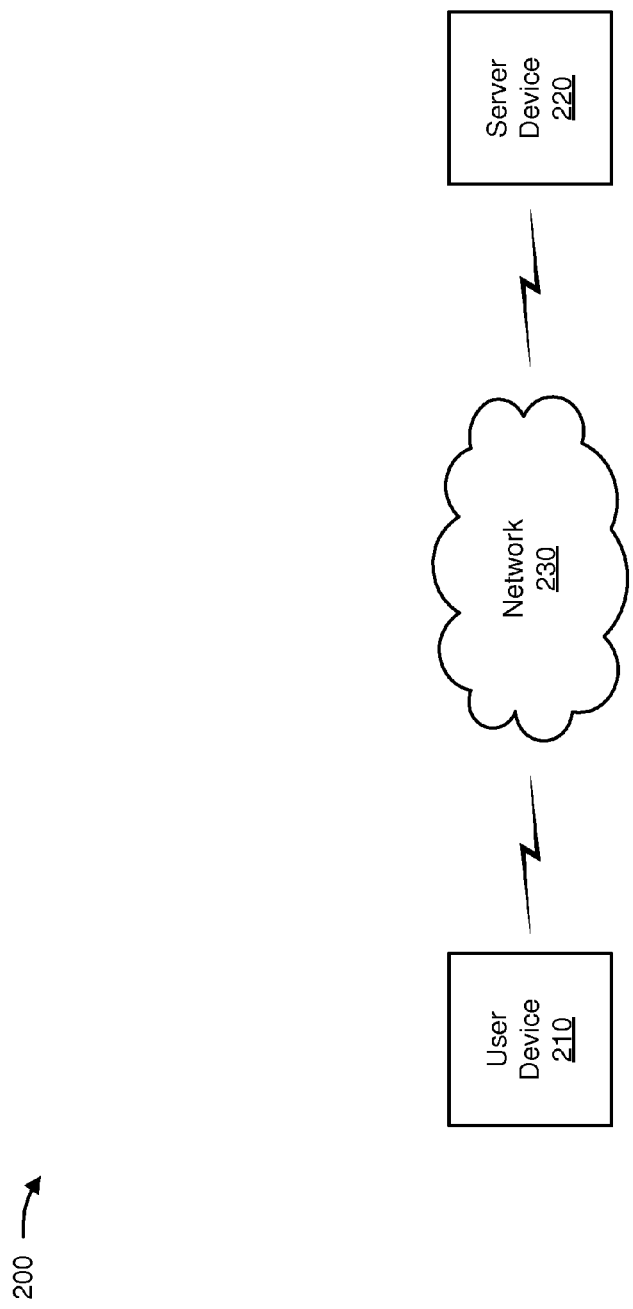
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a server device 220, and a network 230. Devices of environment 200 may interconnect via wired connections, wireless connections, or a combination of wired and wireless connections.

User device 210 may include a device capable of receiving, generating, storing, processing, and/or providing a user interface associated with a product replacement decision. For example, user device 210 may include a communications and/or computing device, such as a mobile phone (e.g., a smart phone, a radiotelephone, etc.), a computer (e.g., a laptop computer, a tablet computer, a handheld computer, a desktop computer), or a similar device. In some implementations, user device 210 may provide a user interface with which to input project variables and receive information regarding one or more deployment strategies. In some implementations, user device 210 may receive information from and/or transmit information to another device in environment 200.

Server device 220 may include one or more devices capable of storing, processing, and/or routing information associated with a product replacement decision. For example, server device 220 may include a server that determines end-to-end costs associated with one or more deployment strategies for the product replacement decision. In some implementations, server device 220 may include stored information regarding a set of other product replacement decisions, and may process the stored information to predict the end-to-end costs associated with the product replacement decision. In some implementations, server device 220 may include a communication interface that allows server device 220 to receive information from and/or transmit information to other devices in environment 200.

Network 230 may include one or more wired and/or wireless networks. For example, network 230 may include a cellular network (e.g., a long term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, although user device 210 and server device 220 are shown as two separate devices, user device 210 and server device 220 may be implemented within a single device. Additionally, or alternatively, a set of devices (e.g., one or more devices) of environment 200 may perform one or more functions described as being performed by another set of devices of environment 200.

Figure 3:
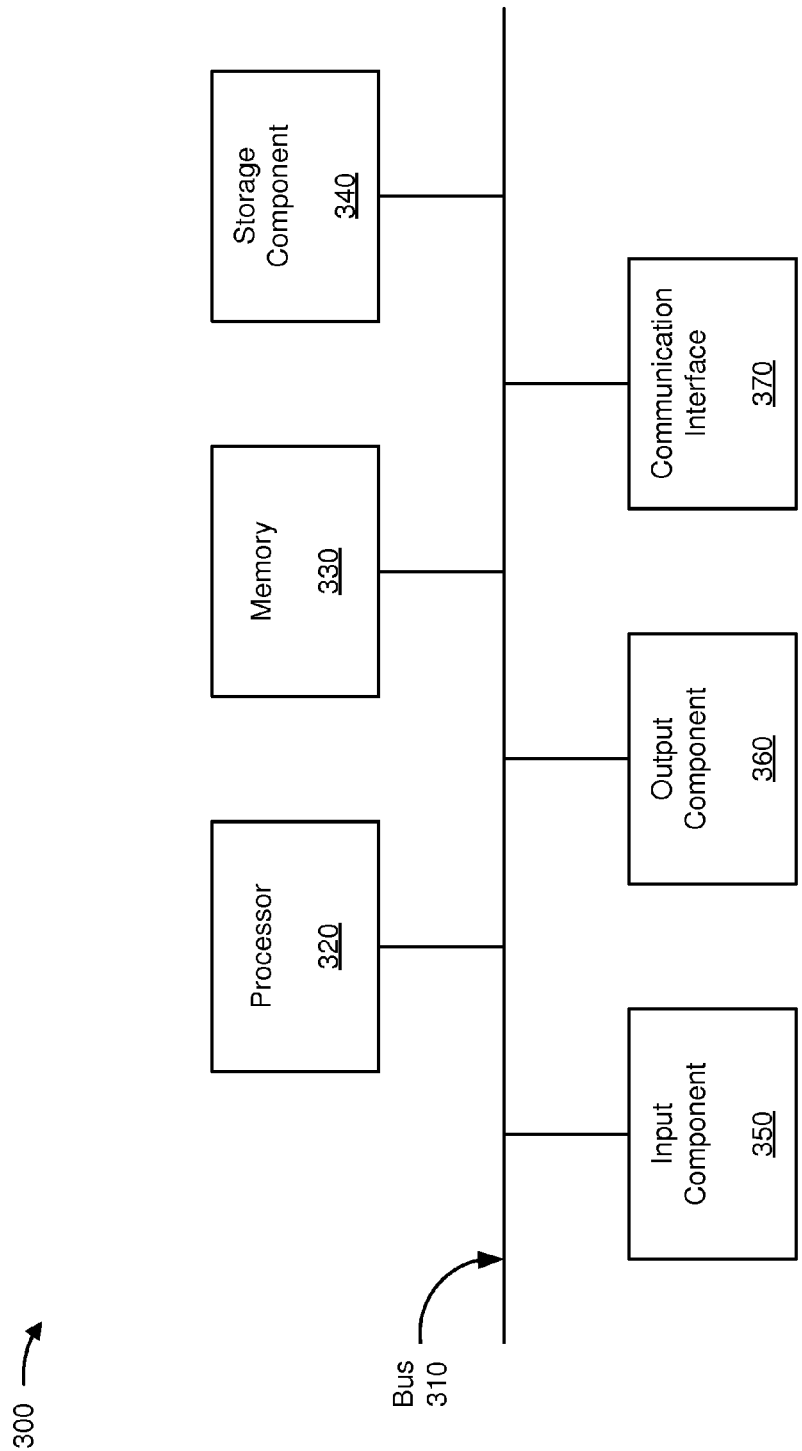
FIG. 3 is a diagram of example components of one or more devices of FIG. 2.

FIG. 3 is a diagram of example components of a device 300. Device 300 may correspond to user device 210 and server device 220. In some implementations, user device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for identifying deployment strategies for a product replacement decision based on end-to-end cost analysis. In some implementations, one or more process blocks of FIG. 4 may be performed by server device 220. In some implementations, one or more process blocks of FIG. 4 may be performed by another device or a group of devices separate from or including server device 220, such as user device 210.

As shown in FIG. 4, process 400 may include providing a user interface for inputting project variables (block 410). For example, server device 220 may provide the user interface to user device 210 for a user to utilize for inputting project variables. A project may refer to a managerial product lifecycle decision regarding replacement of a product. A decision regarding replacement of a product may refer to a decision regarding whether the product is to be repaired, upgraded, re-designed, or the like. In some implementations, a decision regarding replacement of a product may be associated with a particular trigger. For example, server device 220 may determine that a supply incompetency, a risk of immediate product failure, a determination that a product fails in less than a designed period of time, or the like, indicates that a product re-design is appropriate. Additionally, or alternatively, server device 220 may determine that a part or machine upgrade, a new technology launch, a competitor price change, a mismatch between product performance and customer requirements, or the like, indicates that a product upgrade or a product re-design is appropriate.

As further shown in FIG. 4, process 400 may include receiving a set of project variables via the user interface (block 420). For example, server device 220 may receive information identifying a set of project variables via the user interface. In some implementations, server device 220 may receive the information identifying the set of project variables from a user (e.g., via the user interface). Additionally, or alternatively, server device 220 may determine and/or recommend some or all of the project variables based on stored information regarding other projects, based on predetermined projected variable values, or the like. For example, when the user provides server device 220 with information identifying a quantity of products to be replaced, server device 220 may determine a labor cost based on stored information regarding previous replacements of similar parts. In this way, server device 220 may simplify variable input, and may facilitate end-to-end cost projection when the user is unable to determine a particular variable. In some implementations, server device 220 may provide a set of questions regarding a project, and may determine the set of project variables based on responses to the set of questions. For example, server device 220 may access a decision tree or another data structure that stores a set of linked questions, and may provide the set of linked questions to the user to determine the set of project variables. In this way, server device 220 may receive information necessary for providing a set of deployment scenarios corresponding to the particular project.

A project variable may refer to an aspect of the project that may affect viability of a particular deployment strategy, and a value thereof. For example, a set of project variables may include a set of cost variables (e.g., variables associated with a logistic cost, a training cost, a repair cost, a purchase cost, a labor cost, a scrap cost, a storage cost, a shipping cost, a compliance cost, a research and development cost, an engineering cost, etc.), a set of supplier variables (e.g., variables associated with a supplier capacity, a supplier availability, a lead time, an internal purchasing capability, a product quality, a product reliability, etc.), a set of inventory variables (e.g., variables associated with a distribution center inventory, a set of incoming purchase orders, a quantity of defective-on-shelf products, a set of last time buy liabilities, a set of goods in transit, a customer inventory, an inventory segmentation, etc.), a set of install base variables (e.g., variables associated with a rate of replacement, a quantity of units in the install base, a set of service contracts with customers, a field force capacity, a component dependency, an end of life viability, etc.), or the like.

In some implementations, server device 220 may identify cost levers when receiving the set of project variables via the user interface. A cost lever may refer to one or more sets of costs that may be adjusted when implementing a product life-cycle decision (e.g., a set of variable costs), such as a set of supply chain cost levers (e.g., a set of variables associated with a purchase price, a repair price, a logistics cost, a disposal cost, an inventory write off cost, a scrap revenue, a repair yield, a supplier capacity, etc.), a set of business unit cost levers (e.g., a set of variables associated with an engineering support cost, an additional compliance cost, a training cost, a design cost, a failure rate, etc.), a set of customer cost levers (e.g., a set of variables associated with an uplift cost, a field service engineering service cost, an install base, etc.), or the like. In some implementations, server device 220 may identify cost levers based on a user selection. For example, the user may provide information indicating a set of non-fixed variables. Additionally, or alternatively, server device 220 may process information regarding previous projects to identify cost levers. In this way, server device 220 may determine a subset of variables for which, if an estimated value changes, end-to-end costs for the replacement project may change.

As further shown in FIG. 4, process 400 may include determining a set of deployment strategies (block 430). For example, server device 220 may determine the set of deployment strategies to analyze for end-to-end costs. Deployment strategies may refer to one or more parameters associated with implementing a replacement project, such as a product replacement design decision (e.g., a decision to repair the product, a decision to upgrade the product, a decision to re-design and replace the product, etc.), a deployment timeframe, a deployment geographic scope, or the like. For example, server device 220 may identify a particular set of deployment strategies, such as using an existing product (e.g., foregoing replacement), replacing all products immediately, replacing products as the products fail, replacing a particular percentage of products per year, replacing a particular percentage of products per year per region, or the like. Additionally, or alternatively, server device 220 may identify a particular set of deployment strategies that utilize multiple types of product replacement, such as a particular deployment strategy involving repairing a particular quantity of products, re-designing another particular quantity of products, and/or foregoing replacement on another particular quantity of products.

Server device 220 may determine the set of deployment strategies based on information provided by the user, in some implementations. For example, server device 220 may receive information indicating a reason for product replacement (e.g., failure of a particular quantity of products, availability of new technology, material non-availability, etc.), and may select a particular set of deployment strategies based on the reason for product replacement. Additionally, or alternatively, server device 220 may generate a set of deployment strategies based on the set of project variables. For example, server device 220 may identify, based on the set of project variables, a logistical bottleneck that limits product replacements to a particular quantity per year, and may select a set of deployment strategies for which projected product replacements do not exceed the particular quantity per year. Additionally, or alternatively, server device 220 may access information identifying one or more pre-configured deployment strategies. For example, server device 220 may retrieve, from a data structure (e.g., a secure data structure), information identifying a set of deployment strategies used in product replacement projects.

Server device 220 may determine the set of deployment strategies based on one or more algorithms associated with processing the project variables. For example, server device 220 may utilize an algorithm associated with analyzing an existing supply of products, determining shipping costs associated with moving the existing supply of products from a particular warehouse to a particular installation location, and selecting particular deployment strategies that minimize the shipping costs. Additionally, or alternatively, server device 220 may determine the set of deployment strategies based on a set of different algorithms associated with different types of replacement. For example, server device 220 may utilize a first algorithm associated with determining viability for upgrade replacements, a second algorithm associated with determining viability for re-design replacements, a third algorithm associated with determining viability for repair replacements, or the like.

As further shown in FIG. 4, process 400 may include determining a set of end-to-end cost scores for the set of deployment strategies (block 440). For example, server device 220 may calculate a set of end-to-end cost scores for the set of deployment strategies. An end-to-end cost score may refer to an assessment of a particular deployment strategy that accounts for both short term costs (e.g., research and development, product acquisition, compliance costs, etc.), long term costs (e.g., engineering and support costs, training costs, scrap costs, etc.), profits (e.g., scrap value, reduced failure rates, etc.), non-cost factors (e.g., customer satisfaction, publicity, etc.), or the like. In some implementations, server device 220 may determine a threshold end-to-end cost score for the set of deployment strategies. In some implementations, server device 220 may determine that deployment strategies that do not satisfy the threshold end-to-end cost score are to be discarded.

Server device 220 may determine the set of end-to-end cost scores for the set of deployment strategies based on pre-configured calculations, in some implementations. For example, server device 220 may access information identifying one or more formulae, project variable relationships, project variable associations, or the like associated with the set of project variables, and may determine the end-to-end cost scores based on the one or more formulae, associations, or the like. In some implementations, server device 220 may determine the set of end-to-end cost scores based on a set of project criteria. For example, when a project criteria indicates a particular cash flow associated with a company performing a product replacement, server device 220 may assign a particular end-to-end cost score based on determining that replacement project expenditures for a particular deployment strategy conflict with the particular cash flow. In this case, server device 220 may discard the particular deployment strategy.

Server device 220 may identify a set of cost buckets, when determining the set of end-to-end cost scores, in some implementations. For example, server device 220 may organize project variables into cost buckets, such as a service cost bucket, a repair cost bucket, an inventory cost bucket, a logistics cost bucket, a disposal cost bucket, or the like. In this case, server device 220 may compare costs for each cost bucket, when determining the end-to-end cost scores. In this way, server device 220 may provide information useful in analysis of the set of deployment strategies.

As further shown in FIG. 4, process 400 may include providing information identifying the end-to-end cost scores and suggesting a deployment strategy (block 450). For example, server device 220 may provide information identifying one or more deployment strategies, of the set of deployment strategies that satisfy one or more project criteria. In some implementations, server device 220 may rank one or more deployment strategies based on end-to-end cost scores. Additionally, or alternatively, server device 220 may provide information associated with the deployment strategies in order to facilitate decision-making regarding a best deployment strategy. For example, server device 220 may provide information associated with the end-to-end cost scores, such as net present value information, break even analysis information, or the like. In this way, server device 220 may provide information identifying deployment strategy viability, deployment strategy cash flow, or the like.

In some implementations, server device 220 may generate a report regarding a particular deployment strategy, when providing information associated with the end-to-end cost scores. For example, server device 220 may provide a cost bucket comparison, when providing the information identifying the end-to-end cost scores. In this way, server device 220 may facilitate comparison of costs for each element of the project, such as purchase costs, repair costs, logistics costs, service costs, or the like. In some implementations, server device 220 may generate a product replacement plan associated with the particular deployment strategy (e.g., a set of information identifying a quantity of suppliers, a timeline for research and development, or the like). Additionally, or alternatively, server device 220 may provide replacement comparison information associated with the end-to-end costs. For example, for each deployment strategy, server device 220 may provide information comparing costs for upgrading the product, repairing the product, re-designing the product, or the like.

Additionally, or alternatively, server device 220 may provide information distinguishing fixed and variable costs that were included in the end-to-end cost scores. In this way, server device 220 may identify one or more project variables for which an adjustment may significantly affect the end-to-end cost scores (e.g., significantly being a threshold evaluation). For example, a user may provide a particular estimated cost for repairs, and server device 220 may determine that repair costs may be negotiated to another particular value, and may provide information indicating the adjustment to end-to-end cost scores as a result of negotiating repair costs. In this way, server device 220 may provide information identifying a deployment strategy that does not satisfy a set of project criteria, but for which a project variable adjustment may cause the deployment strategy to satisfy the set of project criteria.

As further shown in FIG. 4, process 400 may include providing project information based on a deployment strategy selection (block 460). For example, server device 220 may provide information associated with a selected deployment strategy to a user of user device 210 for review. In some implementations, server device 220 may provide information regarding the deployment strategy, such as a detailed timeline for aspects of the deployment strategy, a set of suppliers to be contacted as part of the deployment strategy, a set of warehouses that are to be procured to store replacement products as part of the deployment strategy, or the like. In this way, server device 220 may provide, to the user, information relevant to product lifecycle management.

Server device 220 may provide project information identifying a set of significant project variables (e.g., significant being a threshold determination), in some implementations. For example, server device 220 may identify a set of significant project variables for which an adjustment to assumed values for the set of significant project variables may significantly affect viability of the project. In this case, a user may adjust an assumed value for a project variable in the set of project variables to determine whether to utilize the deployment strategy. Additionally, or alternatively, server device 220 may determine a set of project variable thresholds for which a threshold cost savings may be realized. For example, server device 220 may determine a particular set of project variables for which a particular percentage adjustment yields a particular percentage cost savings, and may provide information associated with the particular set of project variables and the potential cost savings. In this way, server device 220 may identify potential cost savings and/or assumptions that affect the viability of the deployment strategy.

Server device 220 may provide project information associated with executing the deployment strategy, in some implementations. For example, server device 220 may automatically notify particular people associated with executing the deployment strategy, such as design engineers, managers, shipping consultants, or the like. Additionally, or alternatively, server device 220 may provide the particular people with instructions regarding executing the deployment strategy, such as budget information, contact information, timeline information, or the like. In some implementations, server device 220 may automatically solicit bids from one or more vendors for one or more contracts associated with the deployment strategy using information from the deployment strategy and/or information regarding previous product replacement projects. In this way, server device 220 may facilitate efficient product lifecycle management based on the project variables provided by the user.

Server device 220 may provide project information tracking the deployment strategy, in some implementations. For example, server device 220 may track deployment strategy progress, may compare actual costs against project variable assumed costs (e.g., and may provide updated projections associated with the actual costs), may suggest alterations to the deployment strategy based on tracking deployment strategy progress, or the like. In some implementations, server device 220 may automatically and/or periodically re-perform process 400 utilizing actual costs incurred during product replacement, and may identify a change to the deployment strategy, a new deployment strategy, or the like, based on re-performing process 400. For example, server device 220 may determine, based on actual scrap value, to alter the deployment strategy, and may notify the user and/or one or more other interested parties regarding altering the deployment strategy. In this way, server device 220 may facilitate dynamic product lifecycle management based on new information that may conflict with and/or confirm an initial assumption.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
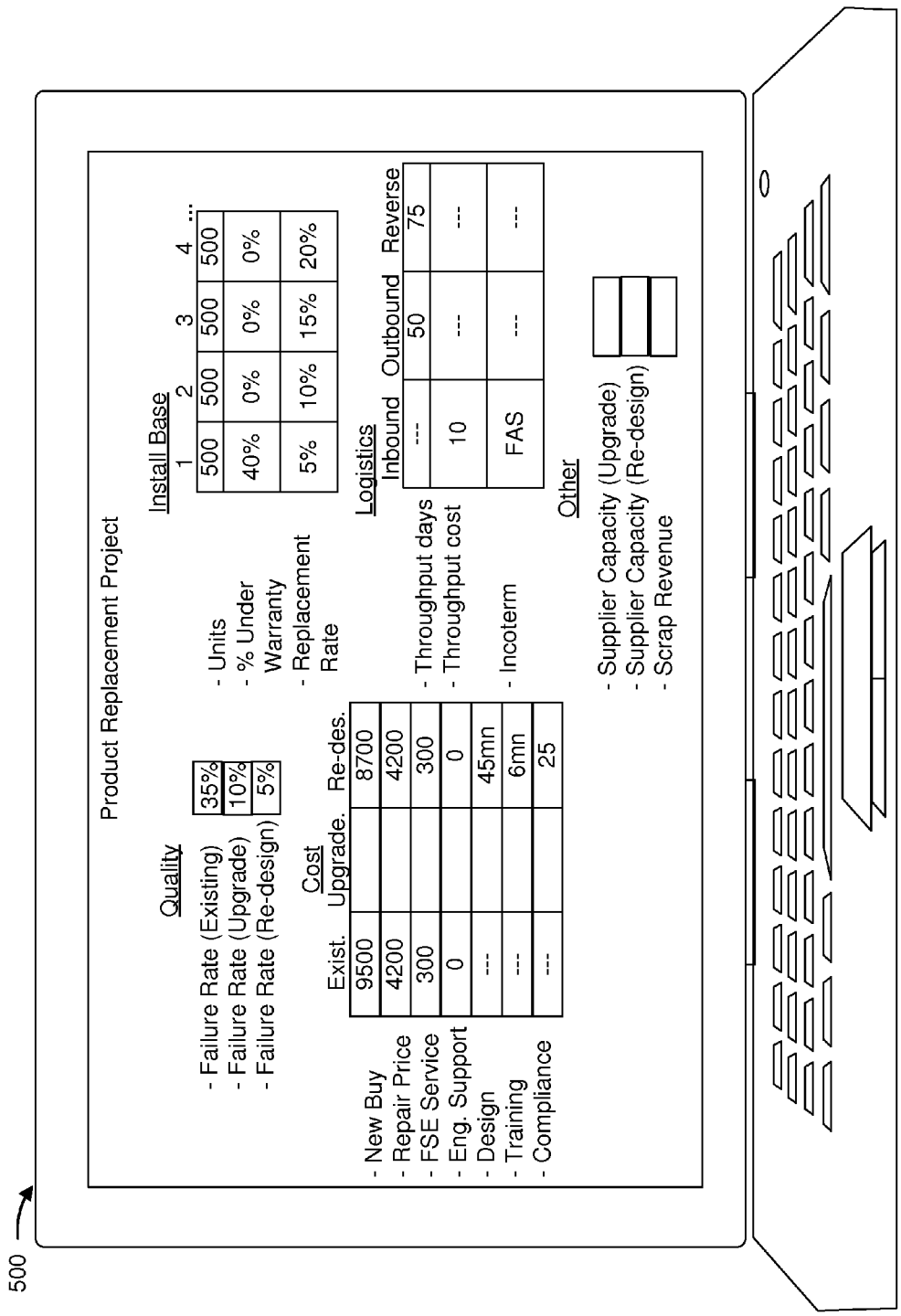
FIGS. 5A-5C are diagrams of an example implementation relating to the example process shown in FIG. 4.
Figure 5B:
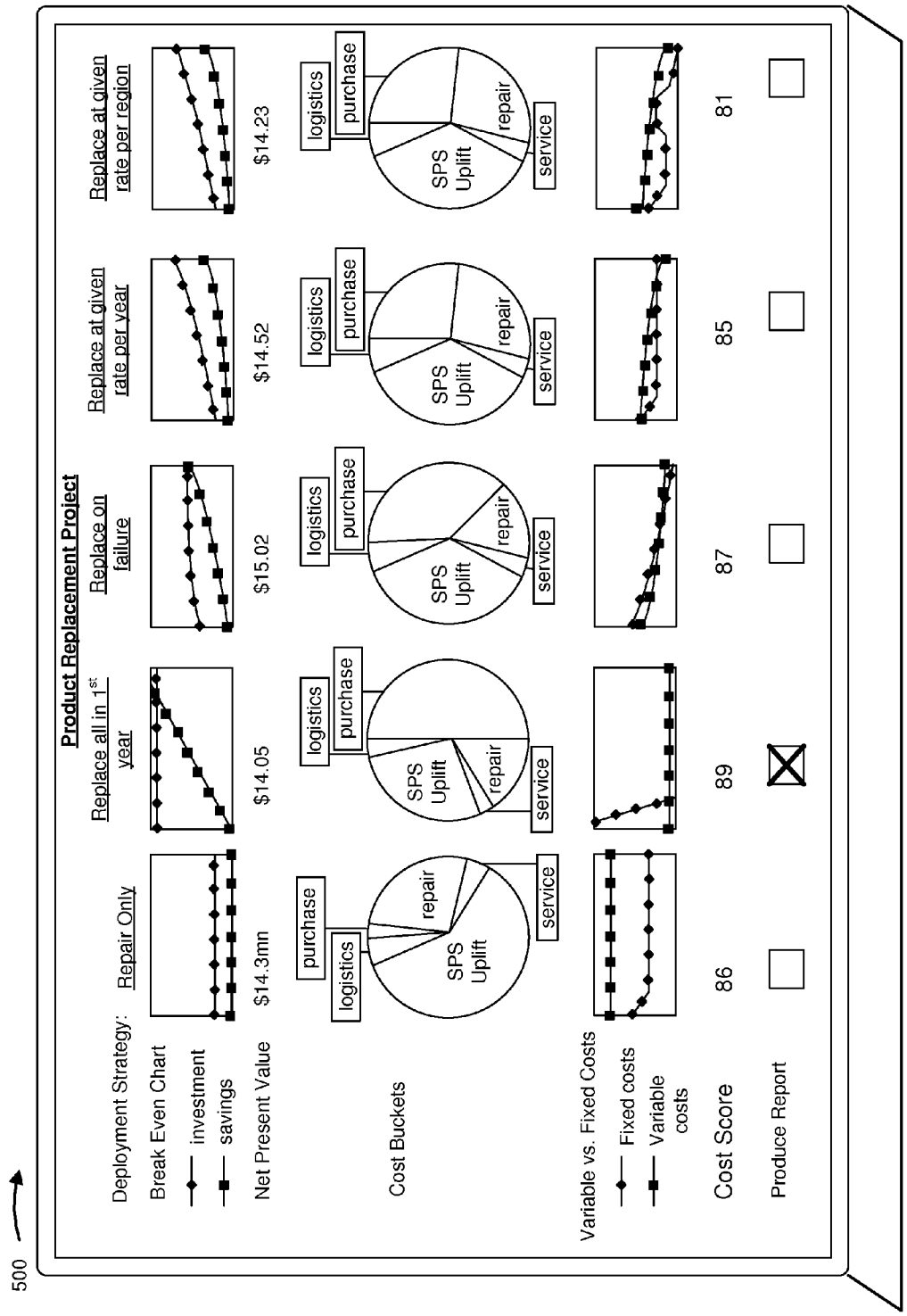
Figure 5C:
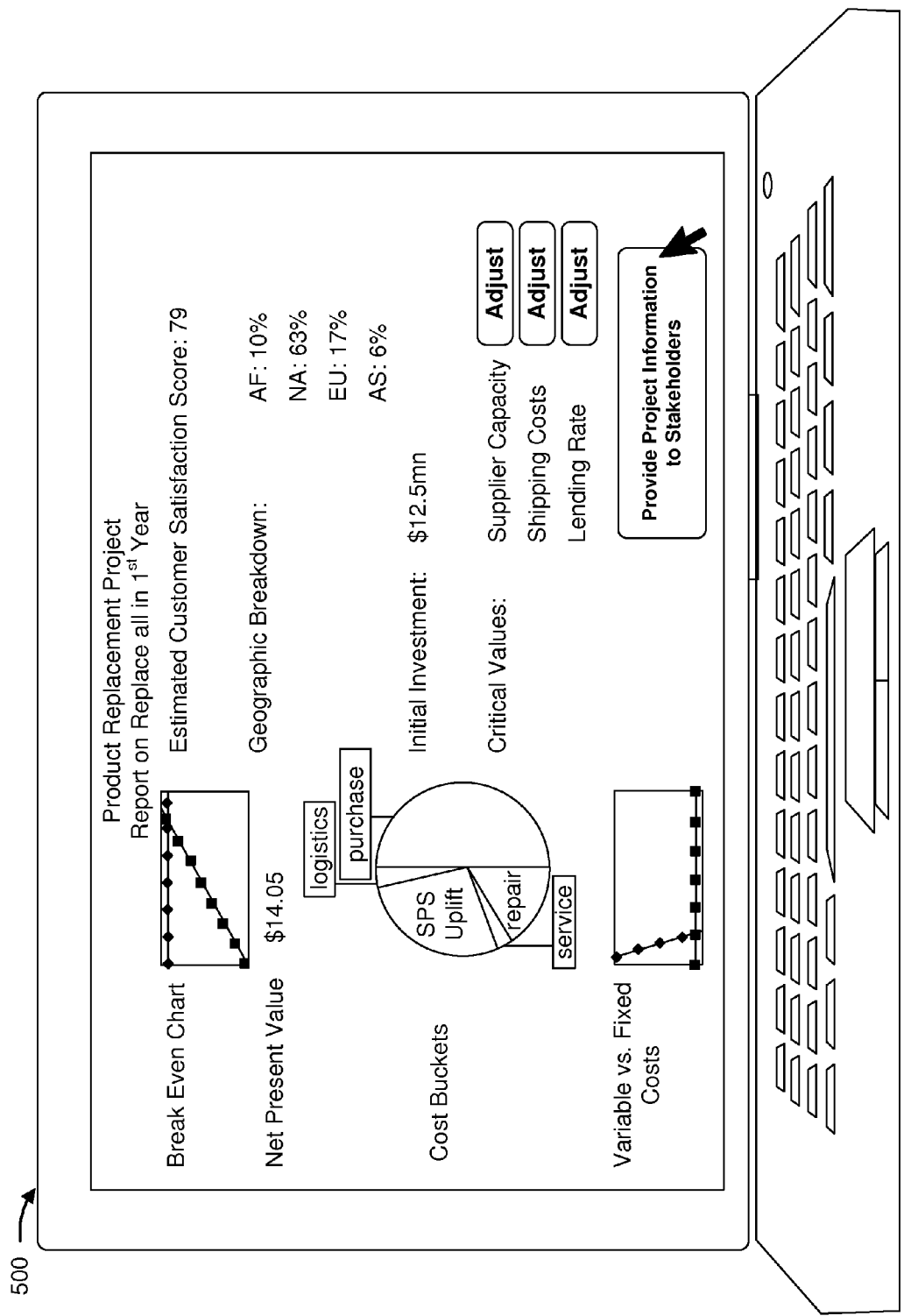

FIGS. 5A-5C are diagrams of an example implementation 500 relating to example process 400 shown in FIG. 4. FIGS.

5A-5C show an example of identifying deployment strategies for a product replacement decision based on end-to-end cost analysis.

As shown in FIG. 5A, user device 210 displays a user interface facilitating input of a set of project variables. Assume that the user inputs the set of project variables, such as product quality variables (e.g., a set of predicted failure rates for an existing product, an upgraded product, and a re-designed product), a set of cost variables associated with an existing product, an upgraded product, and a re-designed product (e.g., a new buy cost, a repair price, a field service engineering (FSE) service cost, an engineering support cost, a design cost, a training cost, and a compliance cost), a set of install base variables (e.g., information associated with a set of years during which the replacement project is to occur, including a quantity of units, a percentage of units under warranty, and a replacement rate), a set of logistics variables (e.g., a quantity of throughput days, a throughput cost, and an international commercial term (Incoterm) identifying a shipping parameter), and a set of other variables (e.g., a supplier capacity for an upgraded product, a supplier capacity for a re-designed product, and a scrap revenue from scrapping a current product).

As shown in FIG. 5B, server device 220 generates analysis regarding a selected subset of deployment strategies for the product replacement project. The selected subset of deployment strategies analyzed includes repairing the product, replacing all units of the product in a first year, replacing the product as the product fails, replacing the product at a particular rate per year, and replacing the product at a particular rate in a particular region. The analysis includes information identifying break-even points, net present value, cost bucket breakdowns, variable and fixed cost comparisons and end-to-end cost scores (e.g., "Cost Scores") for each deployment strategy. In this way, the user is provided with information that may be utilized in determining the particular deployment strategy of a set of deployment strategies that is to be implemented. As further shown in FIG. 5B, assume the user requests a report be generated regarding a particular deployment strategy of replacing all products in the first year.

As shown in FIG. 5C, server device 220 may provide (e.g., via the user interface), a report regarding the particular deployment strategy. The report may include information associated with customer satisfaction, geographic parameters associated with the deployment strategy, initial investment information, and information identifying a set of particular project variables (e.g., a "critical value," such as a supplier capacity, a shipping cost, and a lending rate) that may significantly affect costs associated with the particular deployment strategy if the particular variable were to be different from an initial estimation. In this way, a user can further investigate the set of particular project variables that may afford significant cost savings if adjusted. The report may also include an option to provide project information to stakeholders (e.g., design engineers, part manufacturers, shipping agents, etc.). In this way, a user may provide information relating to design schedules, installation schedules, part orders, or the like.

As indicated above, FIGS. 5A-5C are provided merely as an example. Other examples are possible and may differ from what was described with regard to FIGS. 5A-5C.

In this way, a server device may generate information regarding a set of deployment strategies for a product replacement decision, and may facilitate decision-making regarding the product replacement decision that accounts for end-to-end costs.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc. Furthermore, significance and/or criticality may be threshold determinations based on a particular value satisfying a significance and/or a criticality threshold.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A server device, comprising:
a memory; and
one or more processors to:
provide a user interface for a replacement project;
provide, via the user interface, a set of queries regarding the replacement project;
receive, via the user interface, a set of responses to the set of queries;
determine, based on receiving the set of responses, a set of project variables for the replacement project,
the replacement project including a decision regarding replacing a product;
identify a set of previously used deployment strategies;
determine a set of deployment strategies associated with the replacement project based on the set of project variables and based on the set of previously used deployment strategies,
each deployment strategy, in the set of deployment strategies and in the set of previously used deployment strategies, being associated with:
a type of replacement,
a first parameter identifying a timeframe for deployment of the type of replacement, and
a second parameter identifying a geographical scope for deployment of the type of replacement,
the geographical scope indicating one or more particular areas where the product is to be replaced;
determine a set of end-to-end cost scores for the set of deployment strategies;
provide information identifying one or more deployment strategies of the set of deployment strategies based on the set of end-to-end cost scores for the set of deployment strategies;
identify one or more project variables, of the set of project variables, for which an adjustment affects a particular end-to-end cost score for a particular deployment strategy,
the set of end-to-end cost scores comprising the particular end-to-end cost score, and
the one or more deployment strategies comprising the particular deployment strategy;
determine that the adjustment causes the particular deployment strategy to satisfy a set of project thresholds;
implement the adjustment to the particular deployment strategy based on determining that the adjustment causes the particular deployment strategy to satisfy the set of project thresholds;
deploy the particular deployment strategy based on implementing the adjustment;
automatically track progress of the particular deployment strategy;
automatically identify, based on tracking the progress of the particular deployment strategy, another adjustment to the particular deployment strategy; and
automatically implement the other adjustment to the particular deployment strategy.

2. The server device of claim 1, where the particular deployment strategy is a first particular deployment strategy;
where the one or more processors are further to:
determine a set of project criteria associated with the replacement project;
determine that a second particular deployment strategy of the set of deployment strategies does not satisfy the set of project criteria; and
remove the second particular deployment strategy from the set of deployment strategies; and
where the one or more processors, when providing the information identifying the one or more deployment strategies, are to:
provide the information identifying the one or more deployment strategies based on removing the second particular deployment strategy from the set of deployment strategies.

3. The server device of claim 1, where the one or more processors are further to:
determine a set of rates of replacement associated with the timeframe for deployment of the type of replacement; and
where the one or more processors, when determining the set of deployment strategies, are to:
determine the set of deployment strategies based on the set of rates of replacement associated with replacing the product.

4. The server device of claim 1, where the one or more processors are further to:
determine a set of geographic deployment rates for replacing the product in a set of geographic areas associated with the geographical scope for deployment of the type of replacement; and
where the one or more processors, when determining the set of deployment strategies, are to:
determine the set of deployment strategies based on the set of geographic deployment rates.

5. The server device of claim 1, where the one or more processors are further to:
monitor progress of the replacement project; and
provide information associated with the progress of the replacement project based on monitoring the progress of the replacement project.

6. The server device of claim 1, where the one or more processors are further to:
monitor progress of the replacement project; and
provide information associated with altering a particular selected deployment strategy for the replacement project based on monitoring the progress of the replacement project.

7. The server device of claim 1, where the one or more processors, when providing the information identifying the one or more deployment strategies, are to:
suggest, for execution, the particular deployment strategy based on the particular end-to-end cost score.

8. A non-transitory computer-readable medium storing instructions, the instructions comprising:
one or more instructions that, when executed by one or more processors of a server device, cause the one or more processors to:
provide, via a user interface, a set of queries;
receive, via the user interface, a set of responses to the set of queries;
determine, based on receiving the set of responses, a set of project variables for repairing a product, upgrading the product, and re-designing the product;
identify a set of previously used deployment strategies;
determine a set of deployment strategies associated with repairing the product, upgrading the product, and re-designing the product based on the set of project variables and based on the set of previously used deployment strategies,
    each deployment strategy, in the set of deployment strategies and in the set of previously used deployment strategies, being associated with a timeframe for deployment and a geographic scope of deployment,
        the geographic scope being one or more particular areas where the product is to be replaced;
rank the set of deployment strategies based on a set of quantitative measures associated with the set of deployment strategies and the set of project variables;
provide information identifying one or more of deployment strategies of the ranked set of deployment strategies based on respective quantitative measures in the set of quantitative measures;
identify one or more project variables, of the set of project variables, for which an adjustment affects a particular quantitative measure for a particular deployment strategy,
    the set of quantitative measures comprising the particular quantitative measure, and
    the one or more deployment strategies comprising the particular deployment strategy;
determine that the adjustment causes the particular deployment strategy to satisfy a set of project thresholds;
implement the adjustment to the particular deployment strategy based on determining that the adjustment causes the particular deployment strategy to satisfy the set of project thresholds;
deploy the particular deployment strategy based on implementing the adjustment;
automatically track progress of the particular deployment strategy;
automatically identify, based on tracking the progress of the particular deployment strategy, another adjustment to the particular deployment strategy; and
automatically implement the other adjustment to the particular deployment strategy.

9. The non-transitory computer-readable medium of claim 8, where the one or more instructions, when executed by the one or more processors, further cause the one or more processors to:
select the particular deployment strategy for execution; and
provide information associated with executing the particular deployment strategy.

10. The non-transitory computer-readable medium of claim 8, where the one or more instructions, when executed by the one or more processors, further cause the one or more processors to:
receive information associated with one or more other projects; and
determine the set of quantitative measures for the set of deployment strategies based on the information associated with the one or more other projects; and
where the one or more instructions, that cause the one or more processors to rank the set of deployment strategies, cause the one or more processors to:
rank the set of deployment strategies based on the set of quantitative measures.

11. The non-transitory computer-readable medium of claim 10, where the one or more instructions, that cause the one or more processors to receive the information associated with the one or more other projects, cause the one or more processors to:
receive information identifying customer satisfaction for the one or more other projects; and
where the one or more instructions, that cause the one or more processors to determine the set of quantitative measures for the set of deployment strategies, cause the one or more processors to:
determine the set of quantitative measures based on the information identifying customer satisfaction.

12. The non-transitory computer-readable medium of claim 8, where the one or more instructions, when executed by the one or more processors, further cause the one or more processors to:
suggest one or more values for the set of project variables; and
receive information regarding the one or more values; and
where the one or more instructions, that cause the one or more processors to determine the set of deployment strategies, further cause the one or more processors to:
determine the set of deployment strategies based on the one or more values.

13. The non-transitory computer-readable medium of claim 8, where the one or more instructions, when executed by the one or more processors, cause the one or more processors to:
receive a replacement decision trigger,
    the replacement decision trigger identifying one or more reasons for replacing the product; and
where the one or more instructions, that cause the one or more processors to determine the set of deployment strategies associated with repairing the product, upgrading the product, and re-designing the product, cause the one or more processors to:
determine the set of deployment strategies associated with repairing the product, upgrading the product, and re-designing the product based on the replacement decision trigger.

14. The non-transitory computer-readable medium of claim 8, where the particular deployment strategy is a first deployment strategy; and
where the one or more instructions, when executed by the one or more processors, further cause the one or more processors to:
receive a set of project criteria;
determine that a second particular deployment strategy does not satisfy the set of project criteria; and
remove the second particular deployment strategy from the set of deployment strategies.

15. A method, comprising:
providing, by a server device via a user interface, a set of queries regarding a product replacement project;
receiving, by the server device and via the user interface, a set of responses to the set of queries;
determining, by the server device and based on receiving the set of responses, a set of project variables associated with the product replacement project;
determining, by the server device, a set of project criteria associated with the product replacement project;
identifying, by the server device, a set of previously used deployment strategies;
selecting, by the server device, a set of deployment strategies for the product replacement project that satisfy the set of project criteria based on the set of project variables and based on the set of previously used deployment strategies;

determining, by the server device, a set of end-to-end costs for the set of deployment strategies;
selecting, by the server device, a deployment strategy, of the set of deployment strategies, based on determining the set of end-to-end costs for the set of deployment strategies;
identifying, by the server device, one or more project variables, of the set of project variables, for which an adjustment affects a particular end-to-end cost for the selected deployment strategy,
   the set of end-to-end costs comprising the particular end-to-end cost;
determining, by the server device, that the adjustment causes the selected deployment strategy to satisfy a set of project thresholds;
implementing, by the server device, the adjustment to the selected deployment strategy based on determining that the adjustment causes the selected deployment strategy to satisfy the set of project thresholds;
deploying, by the server device, the selected deployment strategy based on implementing the adjustment;
automatically tracking, by the server device, progress of the selected deployment strategy;
automatically identifying, by the server device and based on tracking the progress of the selected deployment strategy, another adjustment to the selected deployment strategy; and
automatically implementing, by the server device, the other adjustment to the selected deployment strategy.

16. The method of claim 15, where determining the set of project criteria comprises:
identifying a set of install base parameters regarding products in an install base,
   the set of install base parameters indicating a particular cost associated with scrapping products in the install base and indicating a particular cost associated with utilizing products in the install base;
determining an install base utilization for a particular deployment strategy of the set of deployment strategies,
   the install base utilization defining a quantity of products in the install base to scrap and a quantity of products in the install base to utilize; and
determining an install base cost for the particular deployment strategy based on the install base utilization and the set of install base parameters; and
where determining the set of end-to-end costs for the set of deployment strategies comprises:
   determining the particular end-to-end cost for the particular deployment strategy based on the install base cost for the particular deployment strategy.

17. The method of claim 15, further comprising:
selectively adjusting a particular project variable, of the one or more project variables, to determine an association between the particular project variable and the particular end-to-end cost;
determining that the association between the particular project variable and the particular end-to-end cost satisfies a significance threshold,
   the significance threshold being associated with an effect of the particular project variable on the particular end-to-end cost for the selected deployment strategy; and
providing information indicating changes to the particular end-to-end cost for the selected deployment strategy based on changes to the particular project variable.

18. The method of claim 15, where determining the set of project variables further comprises:
determining one or more project variables of the set of project variables based on stored information identifying project variables associated with other projects.

19. The method of claim 15, further comprising:
generating a product replacement plan based on the selected deployment strategy,
   the product replacement plan identifying a type of product replacement, a timeframe for product replacement, and a geographic area for product replacement.

20. The method of claim 15, further comprising:
receiving cash flow information; and
determining that costs associated with the deployment strategy do not conflict with the cash flow information; and
where selecting the deployment strategy comprises:
   selecting the deployment strategy based on determining that costs associated with the deployment strategy do not conflict with the cash flow information.

* * * * *